UNITED STATES PATENT OFFICE.

CHRISTOPHER RIS, OF BASLE, SWITZERLAND, ASSIGNOR, BY MESNE ASSIGNMENTS, TO ANILINE COLOR & EXTRACT WORKS, (FORMERLY JOHN R. GEIGY.)

BROWN SULFUR DYE AND PROCESS OF MAKING SAME.

SPECIFICATION forming part of Letters Patent No. 688,885, dated December 17, 1901.

Application filed February 16, 1901. Serial No. 47,557. (Specimens.)

*To all whom it may concern:*

Be it known that I, CHRISTOPHER RIS, a citizen of the Swiss Republic, residing at Basle, Switzerland, have invented a new and useful Improvement in Brown Sulfur Dyes and Processes of Making the Same, of which the following is a specification.

This invention relates to the production of new dyestuffs containing sulfur dyeing unmordanted cotton in brown shades, which are produced by melting metatoluylenediamin together with a suitable dicarboxylic acid of the general formula

wherein R stands, for instance, for phenylen, ethylon, or analogous residues and with polysulfids of alkali. The following dicarboxylic acids may be used: phtalic acid or its anhydrid, succinic acid or its anhydrid, thiodiglycolic acid, and oxalic acid.

The manufacture of the coloring-matters can be performed in two ways—that is to say, either the metatoluylenediamin may first be transformed into an acidyl derivative by melting the same with the dicarboxylic acid or the latter may directly be added to the mixture of metatoluylenediamin with the polysulfid of alkali. In both cases the best proportions which seem to correspond with the chemical process are those of two molecules of metatoluylenediamin and one molecule of the dicarboxylic acid; but they may always be varied within certain limits. Instead of metatoluylenediamin a nitro compound may be used, which by a treatment with reducing agents furnish this base—viz., ortho-nitro-para-toluidin or para-nitro-ortho-toluidin.

The following examples may be given to illustrate the process of carrying out the invention:

Example I: Thirty-four kilograms of metatoluylenediamin and twenty kilograms of phtalic-anhydrid are melted together at about 120° to 200° centigrade till the development of aqueous vapor is finished. Then the melt is introduced into a fusion of forty kilograms of sulfur in one hundred and twenty kilograms of sodium sulfid. Then the mixture is heated up to 270° to 300° centigrade till the development of sulfureted hydrogen will be finished and an augmentation of the coloring-matter can no more be observed. The process is carried out in an iron vessel fitted with a stirring mechanism. The melt is then pulverized.

Example II: Twenty kilograms of ortho-nitro-para-toluidin are melted with twenty kilograms of phtalic anhydrid at about 150° to 170° centigrade till the development of aqueous vapor is finished. Then the melt is introduced into a fusion of forty kilograms of sulfur in one hundred and twenty kilograms of sodium sulfid. Then seventeen kilograms of metatoluylenediamin are added and the whole treated as described in Example I.

Example III: Thirty-four kilograms of metatoluylenediamin are introduced into a fusion of forty kilograms of sulfur in one hundred and twenty kilograms of sodium sulfid. Then a solution of twenty-eight kilograms of thiodiglycolate of sodium (see p. e. Lovén, *Berichte der Deutschen Chemischen Gesellschaft*, Vol. XVII, page 2818) in about one hundred liters of water is added and the whole treated as described in the first example.

Example IV: Thirty-four kilograms of metatoluylenediamin and seventeen kilograms of oxalic acid are melted together and heated to about 200° centigrade till the development of aqueous vapor is finished and then treated with a fusion of forty kilograms of sulfur in one hundred and twenty kilograms of sodium sulfid, as described in the first example.

In these examples instead of a fusion of sulfur with sodium sulfid a solution of sulfur in caustic-soda lye may be used.

The new coloring-matters form dark powders easily soluble in water with orange-brown color, soluble in alcohol with yellow to orange color and in concentrated sulfuric acid with yellow to orange-brown color, insoluble in ether and benzene. The watery solution yields by addition of acids a dark-brown precipitate of the free color acid, which is soluble in a boiling solution of carbonate of sodium with orange-brown color. When treated with reducing agents, such as powder of zinc and hydrochloric acid, the color acid generates sulfureted hydrogen.

The new coloring-matters dye unmordanted cotton in a bath containing sodium sulfid and salt bright orange-brown shades, which by means of oxidation on the fiber turn into yellowish brown of great fastness to light, alkalies, acids, and to soap.

Having thus described my invention, I claim as new and desire to secure by Letters Patent—

1. The process for the manufacture of new brown sulfur dyestuffs, which consists in melting metatoluylenediamin together with a suitable dicarboxylic acid of the general formula

and with polysulfids of alkali, substantially as described.

2. The process for the manufacture of new brown sulfur dyestuffs, which consists in melting metatoluylenediamin together with phtalic acid in form of its anhydrid and with polysulfids of alkali, substantially as described.

3. As new articles of manufacture the herein-described brown coloring-matters, forming dark powders, easily soluble in water with orange-brown color, soluble in concentrated sulfuric acid with yellow to orange-brown color, soluble in alcohol with yellow to orange color, insoluble in ether and benzene, the watery solution being precipitated by addition of acids in dark-brown flocks of the free color acid, which is soluble in a boiling solution of carbonate of sodium with orange-brown color and which when treated with reducing agents, such as powder of zinc and hydrochloric acid, generates sulfureted hydrogen, the new coloring-matters dyeing unmordanted cotton in a bath containing sodium sulfid and salt bright, orange-brown shades, which by means of oxidation on the fiber turn into yellowish brown of great fastness to light, alkalies, acids and soap, substantially as set forth.

In testimony that I claim the foregoing as my invention I have signed my name in presence of two subscribing witnesses.

CHRISTOPHER RIS.

Witnesses:
ALBERT GRAETER,
GEORGE GIFFORD.